United States Patent [19]

Langlois

[11] 4,125,582

[45] Nov. 14, 1978

[54] MARBLEIZATION OF PLASTIC MATERIALS

[75] Inventor: James L. Langlois, Shrewsbury, Mass.

[73] Assignee: The Gillette Company, Boston, Mass.

[21] Appl. No.: 660,008

[22] Filed: Feb. 23, 1976

[51] Int. Cl.² .......................... B29C 9/00; B29C 69/00
[52] U.S. Cl. ......................................... 264/73; 264/75; 264/329
[58] Field of Search ...................... 264/73, 74, 75, 78, 264/329

[56] References Cited

U.S. PATENT DOCUMENTS

| 3,291,883 | 12/1966 | Cornelius | 264/329 |
| 3,461,498 | 8/1969 | Ramaika | 18/12 |
| 3,664,790 | 5/1972 | Hollander | 425/207 |
| 3,817,675 | 6/1974 | Maiocco | 425/207 |
| 3,832,431 | 8/1974 | Maththaie | 264/75 |

Primary Examiner—Thomas P. Pavelko
Attorney, Agent, or Firm—George E. Kersey

[57] ABSTRACT

Methods and apparatus for marbleizing molded parts produced by screw extruder machines. Liquid colorant is advantageously injected at a comparatively high pressure into a melt containing portion of the machine between the screw and its housing, where the melt is either completely molten or more than fifty percent molten.

5 Claims, 6 Drawing Figures

MARBLEIZATION OF PLASTIC MATERIALS

BACKGROUND

This specification relates to the marbleization of materials, and more particularly, to the marbleization of materials extruded from injection machines of the screw type.

Marbleization is often desired in molded parts for esthetic reasons. The marbleization is in the form of irregular streaks and striations, of varying intensity and color, in the finished article.

In the case of molded articles the desired marbleization has been achieved by using injection machines of the plunger type. Colorant pellets are added to the regular feed pellets at the feed hopper of the machine. After being melted, the colorant and feed materials are driven by a plunger into the associated mold. Since there is little or no mixing in a plunger machine, the colorant and feed materials tend to remain separate. This separation is carried into the mold and the desired marbleization is easily achieved.

By contrast, in an injection machine of the screw type, the addition of colorant pellets to the regular feed pellets merely modifies the coloration of the output product as illustrated by U.S. Pat. No. 3,854,630 which issued Dec. 19, 1974. The reason is that there is invariable mixing in screw machines and the output melt is relatively homogeneous.

As a result, successful commerical marbleization of molded products has been achieved only with plunger machines. The latter, however, do not produce uniform marbleization and cannot be used with unbalanced molds. In addition, they are slower and less efficient than screw machines. As a result, a number of attempts have been made to produce marbleized products with screw machines.

One such attempt was disclosed in U.S. Pat. No. 3,817,675 which issued June 18, 1974. In this patent a colorant hopper is positioned to apply feed pellets at the melt interface between a special "adiabatic" screw and a mixer. It is apparent that the provision of mixing stages beyond the place of introduction of colorant material tends to mix the colorant with the base material. Moreover, although it is contended that a mottled or marbleized effect can be achieved, it is acknowledged that this requires minimization of the number of mixing stages.

Attempts also have been made to achieve the desired marbleization by injecting colorants into the nozzle cavities of screw machines. The nozzle pressures are so great that injection of the colorant is difficult. In addition, when the colorant does manage to enter the nozzle cavity it produces a void that causes undesirable delamination in the molded parts.

Accordingly, it is an object of the methods and apparatus hereafter disclosed to enhance the efficiency and rate of marbleization of molded parts. A related object is to achieve marbleization with injection machines of the screw type.

Another object is to eliminate the need for reliance on plunger machines and special screw machines to achieve marbleization. A related object is to avoid the requirement for using an adiabatic screw. Another related object is to achieve marbleization with standard screw injection machines.

Still another object is to achieve marbleization in both balanced and unbalanced molds. A further object is to achieve relatively uniform marbleization in both balanced and unbalanced molds.

SUMMARY

In accomplishing the foregoing and related objects, provision is made for injecting a liquid colorant into the melt of a screw injection machine between the screw and its housing to achieve controlled marbleization of machine molded parts.

In accordance with one inventive aspect, the injection is made into any region of the machine where the feed is either completely molten, or substantially, i.e. more than 50 percent, molten, with the degree of striation being governed by the location of the colorant injection.

The striations became wider to the extent that the injection of colorant takes place as close to the output end of the machine as possible, as long as the injection is into a region where the screw is positioned opposite the point of injection. The injection can take place through one or more injector fittings mounted in the housing of the machine. This permits the realization of multicolor marbleization.

In accordance with another inventive aspect, the injection of colorant into the melt is made at a comparatively high pressure which is advantageously at least three times as great as the maximum melt pressure between the screw and its housing. In one embodiment the injection pressure is over about 3000 lbs. per square inch, and preferably over about 3600 lbs. per square inch.

In accordance with a further inventive aspect, the injection is made of liquid colorant which has at least substantially the same relative viscosity as the melt, with the colorant advantageously having a relative viscosity which is in the range from about sixty to eighty percent greater than that of the melt.

In accordance with a yet further inventive aspect, the injector orifices have a diameter in the range from about 0.018 inch to about 0.025 inch, and the injection capacity per injection stroke is in the range from about 0.001 cubic inch to about 0.008 cubic inch.

In accordance with still another inventive aspect of the invention, the injection screw is of the reciprocating type, with the injector unit advantageously positioned in the vicinity of the non-return valve near the output end of the machine when maximum width streaking is desired of the marbleizaed part. The injection can be made while the reciprocating screw is at rest; in its most forward position; in its most rearward position; during reciprocating; and during injection.

In accordance with yet another inventive aspect, the colorant injection can be made into a wide variety of thermoplastic melts including, for example, styrene and nylon.

DESCRIPTION OF THE DRAWINGS

Other inventive aspects will become apparent after considering several illustrative embodiments taken in conjunction with the drawings, in which.

DETAILED DESCRIPTION

Figure 1A:
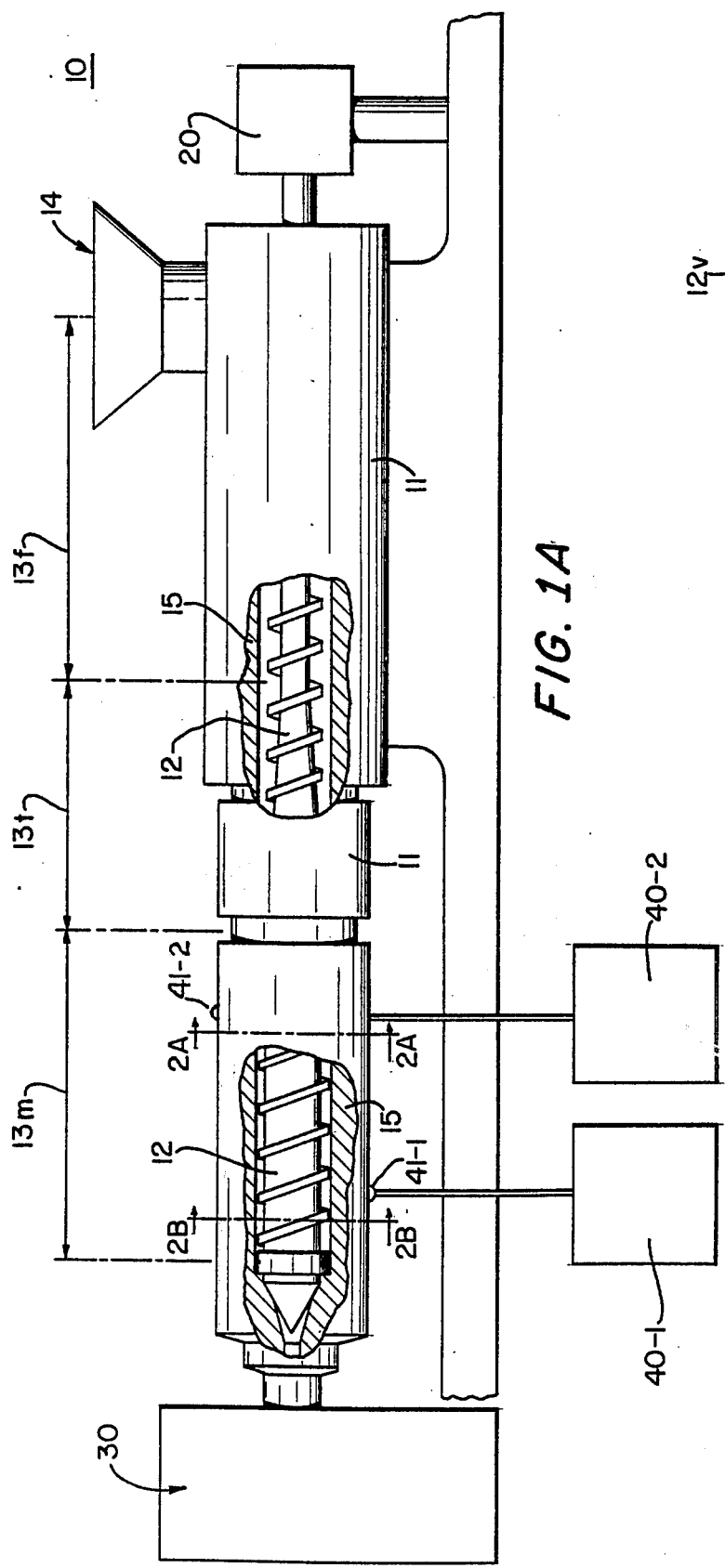
FIG. 1A is a schematic diagram of a screw injection molding machine, which has been modified in accordance with several inventive aspects.

Turning to the drawings, a screw injection molding maching 10, which has been modified for the practice of various inventive aspects is shown in FIG. 1A.

The machine 10 has a longitudinal barrel 11, shown partially in section, in which an extrusion screw 12 is mounted for operation by a motor 20. Where the screw 12 is of the reciprocating type, the motor 20 provides rotation within the barrel 11 and the action of the screw against the melt provides reciprocation along the axis of the barrel.

The screw 12 is of the standard type employed in injection molding and includes a feed section 13$f$, a transition section 13$t$ and a metering section 13$m$.

Feed for the machine is in the form of pellets placed in a hopper 14 in the feed section 13$f$. In this portion of the machine the screw 12 has a comparatively small root diameter and conveys the pellets in the direction of the screw rotation toward the transition section 13$t$. Because of the shear forces exerted against the pellets, they begin to melt during the course of their travel.

In the transition section 13$t$, the root diameter of the screw gradually increases towards the metering section 13$m$, and the pressure exerted increases correspondingly. This is because an increasing percentage of the feed becomes molten and a shallower depth of the screw thread will suffice. When the feed has traversed about 50 percent of the transition section 13$t$, it is illustratively about 50 percent molten.

By the time the feed reaches the end of the transition section 13$t$, it is substantially molten, for example, about ninety eight percent molten, and it exerts maximum internal pressure, for example, about 1000 pounds per square inch. It then enters the metering section 13$m$, which has a relatively shallow depth of screw thread, to permit a suitable level of pressure to develop. In a representative case the pressure drops from 1000 pounds per square inch at the end of the transition section 13$t$ to about 200 pounds per square inch over the metering section 13$m$.

The output end of the machine is coupled to a mold 30, into which molten plastic material is injected at comparatively high pressures, for example, greater than 10,000 pounds per square inch to produce the desired product.

It will be understood that the machine 10 includes heating coils to maintain the fluidity of the melt in the metering section in accordance with the conventional practice, as well as other standard accessories. An illustrative injection molding machine is the New Britain Model 175 manufactured by the New Britain Machine Workds of New Britain, Conn.

In accordance with one inventive aspect, and as indicated in FIG. 1, the metering section includes dye injector fittings 41-1 and 41-2, which are operated from injector units 40-1 and 40-2. It is the operation of the injector units and the fittings that achieves the desired marbleization of plastic parts being formed in the mold 30.

The number of injectors depends upon the number of different color effects desired. In the embodiment of FIG. 1A, a two-color marbleization of the base material is realized, with a different color variation provided by each of the injectors 41-1 and 41-2.

In accordance with further inventive aspects, the injection of the dye takes place in either a completely or substantially molten portion of the feed material between the screw 12 and its housing 15. Surprisingly, the injection may be made in any location of the barrel 11 where the screw is present and the feed is substantially molten. Thus the injector 41-1 is located in the metering section where the feed typically is completely molten while the injector 41-2 is located where the feed is typically over about 98 percent molten. The feed in the metering section 13$m$ typically becomes completely molten about three-quarters of its axial distance from the transition sect on 13$t$. In addition, it has been discovered that injection can be made in qualifying portions of the transition section 13$t$, even through the pressure characteristics in the transition section are entirely different than in the metering section, but it cannot be made where the feed material is not substantially, i.e., less than 50 percent, molten, or where the screw is absent, for example, at the output reservoir beyond the end of the screw.

The precise location of the injectors 41 along the axis of the barrel depends upon the extent to which the marbleization is desired to show some color mixing. In the forward position of the injector 41-1, near the output end of the barrel 11, there is no appreciable color mixing and the striations of the marbleization is of maximum width. In the down feed position of the second injector 41-2, there is a tendency for more mixing to take place before the dye reaches the extruder nozzle, and the striations of the marbleization tend to have lesser width.

Figure 1B:
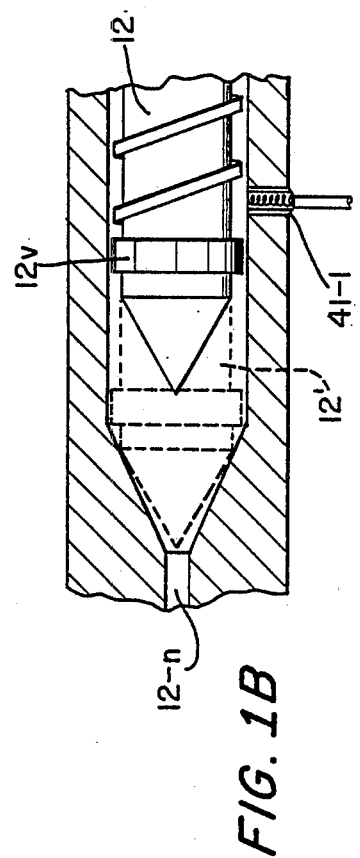
FIG. 1B is a fragmentary cross sectional view of the machine of FIG. 1A.

In any event, the injection cannot take place where the screw is not present. This, as indicated in FIG. 1B, the most forward position of an injector is at the location of the first injector 41-1, which for a reciprocating screw of the kind illustrated, is just beyond the most rearwards position of the shut-off 12$v$. In conventional operation of a reciprocating screw, it moves between the phantom position 12' and the retracted position 12. Of course, if dye injection is desired only with the screw completely forward, the first injector 41-1 can be moved, correspondingly, to a more forward position. In any event, the injection cannot take place in the nozzle cavity 12$n$, because it not only fails to achieve the desired marbleization, but it also has an adverse effect on the parts being molded.

In accordance with another inventive aspect, the colorant is injected at a comparatively high pressure relative to the maximum pressure between the screw and the housng. In general, the colorant injection should be at least about, and desirably above, three times the maximum internal pressure. Thus where the maximum internal pressure is 1,000 psi (between the transition and metering sections) the colorant injection pressure should be above 3,000 psi., notwithstanding that injection can be made at a much lower pressure, particularly in the metering section where the internal pressure is typically on the order of 200 psi. However, it has been found that high rate, relatively uniform marbleization requires comparatively high colorant pressures.

Figure 2A:
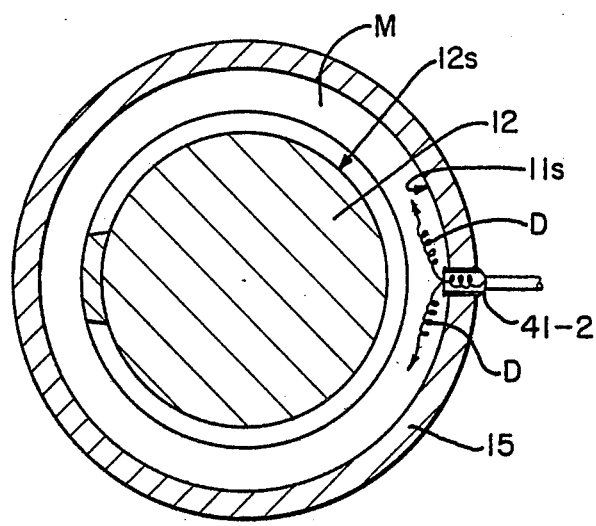
FIG. 2A and 2B are cross sectional view of the barrel of the machines of FIG. 1A.
Figure 2B:
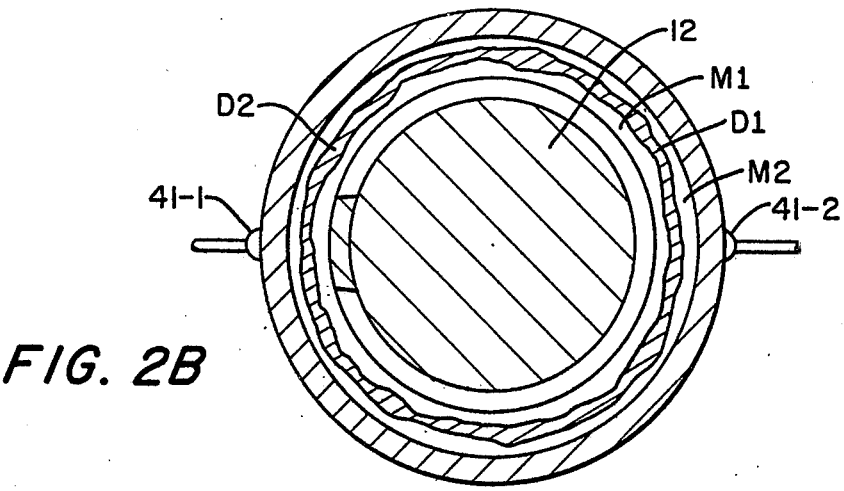

The effect of dye injection in accordance with several inventive aspects is illustrated in FIGS. 2A and 2B.

It is believed that when the dye D is injected into the melt M under comparatively high pressure it is repelled by heat from both the screw surface 12S and the barrel surface 11S and reaches equilibrium at an intermediate level between the two surfaces.

Injection samples taken from apparatus used in practicing various inventive aspects have indicated that the dye tends to to form a ring as shown in FIG. 3B, with the band of the ring being densest near the point of injection of the dye. In FIG. 2B the injection is made of two different colors, on opposite sides of the barrel, and the bands from the colors tend to form a complete ring.

It appears that the ring formation of FIG. 2B accounts for the face that marbleization can be achieved regardless of whether the mold 30 is balanced or unbalanced.

Figure 2C:
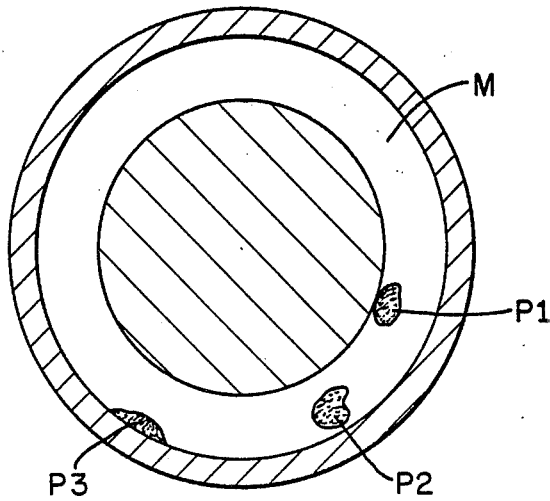
FIG. 2C is a cross sectional view of a barrel of an alternative machine.

In a balanced mold, the diestance that the melt travels from the nozzle is the same for each cavity. The opposite situation exists in an unbalanced mold. When the prior art plunger technique is used to achieve marbleization, it is necessary for the mold to be balanced if the marbleization is to be relatively uniform. The reason is indicated by FIG. 2C, which shows that the colorant is in random pockets P1 through P3. Unless the mold is completely balanced there will be asymmetry in the distribution of pigment. This is by contrast with FIG. 2B. Because the pigment tends to form rings, there will be little or no asymmetry in the distribution of molten material in the mold cavities.

Figure 3:
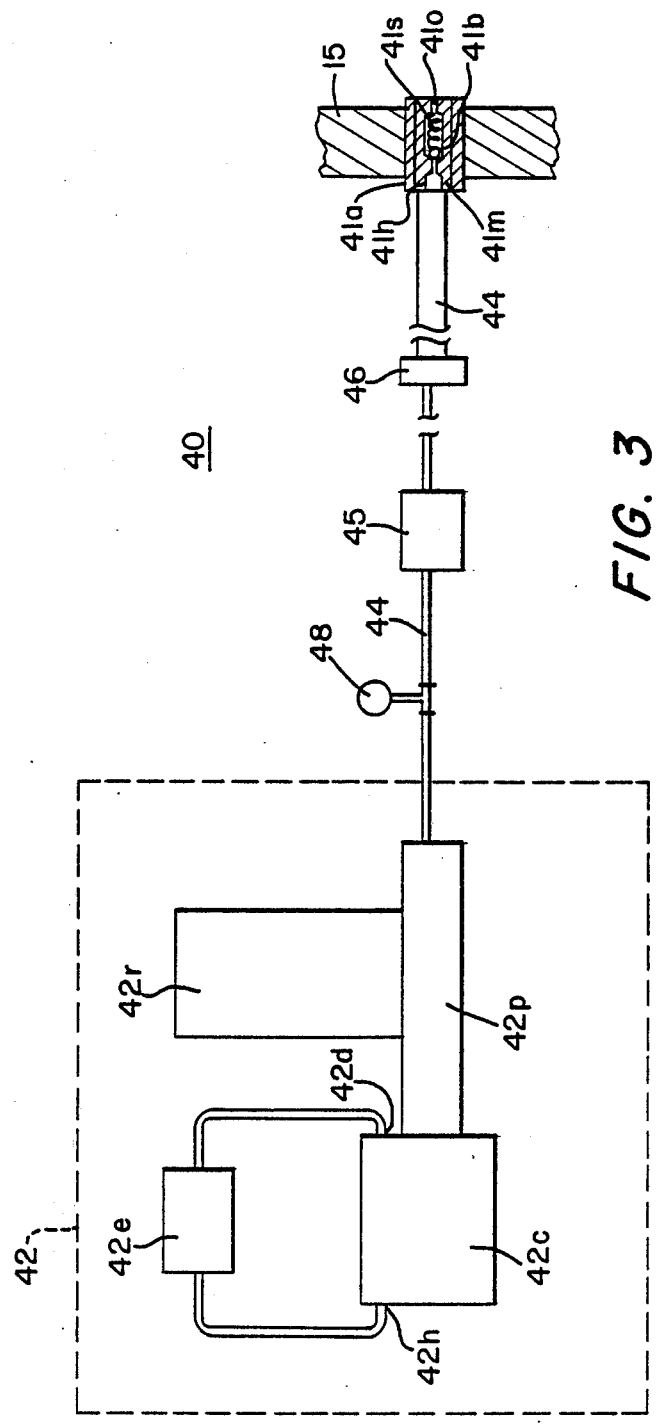
FIG. 3 is a schematic diagram of the injector unit and fittings used in accordance with various inventive aspects.

A block diagram of an illustrative injector machine 40 for practicing various inventive aspects is shown in FIG. 3.

The injector mechanism 40 is formed by a pump 42 that forces dye from a reservoir 42r over a feed line 44, through a check valve 45 to a volume control unit 46 to an injector 41. The pump 42 includes a plunger 42p which is operated by a cylinder 42c that acts in conjunction with a solenoid operated valve 42e.

The guage 48 in the line 44 gives an indication of the injection pressure. The dye material is a liquid pigment with a viscosity similar to that of the melt.

The cylinder 42c and the plunger 42p operate in conventional fashion. As air fluid from the valve 42e is forced into the head inlet 42h of the cylinder 42c, the plunger 42p forces dye along the line 44. Conversely, as air fluid is forced into the rod inlet 43d of the cylinder 42c, the plunger 42p is retracted.

Suitable apparatus for operating the injectors 41-1 and 41-2 is the model 82653 or the Model 87616 CENTRO-MATIC units manufactured by the Lincoln Company of St. Louis, Mo.

As shown in FIG. 3, the injector is a high pressure metering unit 41m imbedded in an adapter 41a. The metering unit 41m includes a housing 41h and a check ball 41b that is loaded by a spring 41s. The housing 41h is pressed into the adapter 41a which has an outlet orifice 41o that is properly proportioned to achieve the desired injections.

In a tested embodiment a nylon melt had a relative viscosity of about SAE 50, and colorants had a relatively viscosity between about SAE 80 or 90, or about 60 to 80 percent higher than the melt viscosity. The outlet orifice had a diameter ranging between 0.018 inch and 0.025 inch.

It was discovered experimentally that an orifice less than about 0.018 inch produced clogging and that an orifice greater than about 0.025 inch permitted feedback of the melt. A typical orifice had a diameter of about 0.023 inch. The volume control unit 46 controls the volume of injection per stroke of the pump unit 42. The volume of dye injected per stroke can range between 0.001 to 0.008 cubic inches. An injection of 0.008 cubic inch per stroke is suitable for light color pigment, while 0.001 cubic inch per stroke is suitable for dark pigment.

A volume control unit which provides 0.001 cubic inch per stroke is the Series SL-1 of the Lincoln Manufacturing Company of St. Louis. The Lincoln Series SL-32 provides 0.008 cubic inches per stroke.

For screw extruders of conventional type, an injection pressure of about 3600 psi has been found adequate to achieve suitable injection in accordance with FIGS. 2A and 2B.

The invention is further illustrated by the following non-limiting examples:

EXAMPLE I

White pellets are fed into the hopper 14 of FIG. 1. If no colorant is added, the molded product will be white. Black dye is applied in a single shot to injector 41-1 which has a capacity of 0.001 cubic inch per shot, during the forward stroke of a reciprocating screw extruder. Green dye is applied in a single shot to the second injector 41-2, which has a capacity of 0.008 cubic inch per shot, during rotation of the reciprocating screw. After rotation of the screw ceases, another shot of black dye is injected at the forward injector 41-1. The foregoing procedure is repeated during each cycle of the reciprocating screw. The result is a deep green marbleization of the molded part. In addition, the marbleization pattern is similar from part to part.

EXAMPLE II

White colored pellets are fed into the hopper 14 of FIG. 1. Black dye is injected through injector 41-1 during each cycle of a reciprocating screw, with one shot when the screw is in its forward position and one shot at the end of the screw rotation. The amount injected on each shot is about 0.001 cubic inch. The result is a black marbleization of the molded parts.

EXAMPLE III

White colored pellets are fed into the hopper 14 of FIG. 1. Red dye is applied through the forward injector 41-1, which provides 0.008 cubic inch per shot. Blue dye is applied through the rearward injector 41-2 which provides 0.001 cubic inch per shot. After a reciprocating screw has traveled about 3/16 inch, both color injectors are operated. They are operated again when the reciprocating screw is in its more rearward position. The result is a blue-red marbleization of the molded product.

It will be apparent that the dye may be injected during any of a number of different operating conditions of a reciprocating screw machine. When the screw is in its forward position, injection can be made of one or more colors. As the screw begins to return to its initial position, optional injection can be made of one or more colors while the screw is swirling. When the screw is at rest and the nozzle chamber is being loaded, injection can again be made of one or more colors. Subsequently, as the screw begins to go forward, injection again can be made of one or more colors. Time of injection determins the position of the color effect on the molded object and is determined experimentally.

While various inventive aspects have been illustrated by the foregoing detailed embodiments, it will be understood that various substitutions of equivalents may be made without departing from the spirit and scope of the invention set forth in the appended claims.

What is claimed is:

1. The method of marbleizing parts molded with a screw injection machine which comprises
   (a) injecting liquid colorant into a melt within the machine between a heated surface of the screw and a heated interior surface of the barrel for the screw at a comparatively high pressure to form a band of colorant at an intermediate level between the two surfaces;
   (b) ejecting the melt from the machine with said band of colorant maintained at an intermediate level within the melt; and
   (c) forcing the ejected melt into a mold to produce a marbleized part.

2. The method of claim 1 wherein said mold is balanced.

3. The method of claim 1 wherein said mold is unbalanced.

4. The method of claim 1 wherein said colorant is injected into said machine where said melt is completely molten.

5. The method of claim 1 wherein said screw injection machine is of the reciprocating type, and the injection is made in the vicinity of a non-return valve for said screw.